United States Patent
Müller (10) Patent No.: US 11,248,701 B2
(45) Date of Patent: Feb. 15, 2022

(54) TRANSMISSION STRUCTURE FOR A SERIAL/PARALLEL HYBRID VEHICLE

(71) Applicant: Volkswagen Aktiengesellschaft, Wolfsburg (DE)

(72) Inventor: Frank Müller, Essenrode (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 213 days.

(21) Appl. No.: 16/605,904

(22) PCT Filed: Apr. 11, 2018

(86) PCT No.: PCT/EP2018/059252
§ 371 (c)(1),
(2) Date: Oct. 17, 2019

(87) PCT Pub. No.: WO2018/192815
PCT Pub. Date: Oct. 25, 2018

(65) Prior Publication Data
US 2021/0284007 A1    Sep. 16, 2021

(30) Foreign Application Priority Data
Apr. 18, 2017   (DE) ..................... 10 2017 206 510.9

(51) Int. Cl.
*B60K 6/40* (2007.10)
*F16H 63/34* (2006.01)
(Continued)

(52) U.S. Cl.
CPC .......... *F16H 63/3416* (2013.01); *B60K 6/40* (2013.01); *B60K 6/442* (2013.01); *B60K 6/547* (2013.01);
(Continued)

(58) Field of Classification Search
None
See application file for complete search history.

(56) References Cited

U.S. PATENT DOCUMENTS

| 3,799,284 A | 3/1974 | Hender | ...................... 180/65.25 |
| 3,823,620 A | 7/1974 | Bricout | ............................ 475/2 |

(Continued)

FOREIGN PATENT DOCUMENTS

| DE | 2224771 A | 11/1972 | ............. B06K 6/365 |
| DE | 2253223 A | 5/1973 | ............... B60K 1/02 |

(Continued)

OTHER PUBLICATIONS

International Search Report and Written Opinion, Application No. PCT/EP2018/059252, 22 pages, dated Jul. 13, 2018.

*Primary Examiner* — Dirk Wright
(74) *Attorney, Agent, or Firm* — Slayden Grubert Beard PLLC (57) ABSTRACT

The invention relates to a transmission structure for a hybrid vehicle with an internal combustion engine, a first electric machine, and a second electric machine. In this case, a first electric machine shaft which is assigned to the first electric machine can be driven by a drive shaft which can be driven by the internal combustion engine via a first gear set. In this case, a travel drive gear of a differential gearing of the vehicle can be driven by a second electric machine shaft assigned to the second electric machine via a second gear set. The transmission structure can thereby be compactly designed and in particular, the use of the installation space and/or the efficiency of the electric machines can be improved in that the first gear set has a ring gear with inner teeth and a spur gear which engages with the inner teeth of the ring gear.

9 Claims, 7 Drawing Sheets

(51) Int. Cl.
*B60K 6/442* (2007.10)
*B60K 6/547* (2007.10)
*F16H 37/08* (2006.01)
*B60K 6/387* (2007.10)

(52) U.S. Cl.
CPC .......... *F16H 37/0806* (2013.01); *B60K 6/387* (2013.01); *B60Y 2200/92* (2013.01); *F16H 2702/04* (2013.01)

(56) References Cited

U.S. PATENT DOCUMENTS

| | | | |
|---|---|---|---|
| 5,934,395 A | 8/1999 | Koide et al. | 18/65.235 |
| 9,199,528 B2 | 12/2015 | Park et al. | |
| 2013/0192417 A1 | 8/2013 | Fujita et al. | 74/661 |
| 2013/0288854 A1 | 10/2013 | Kobayashi | 477/5 |
| 2016/0101681 A1* | 4/2016 | Okuwaki | B60K 6/387 475/5 |

FOREIGN PATENT DOCUMENTS

| | | | | |
|---|---|---|---|---|
| DE | 102006041160 A1 | 9/2008 | ............... | B06K 6/36 |
| DE | 102007016218 A1 | 11/2008 | ............... | B60K 6/22 |
| DE | 102014107222 A1 | 5/2015 | ............... | B60K 6/36 |
| DE | 102017206510 A1 | 10/2018 | ............... | B06K 6/36 |
| EP | 1902887 A2 | 3/2008 | ............ | B60K 17/04 |
| EP | 2857243 B1 | 4/2015 | ............... | B60K 6/36 |
| JP | 2011011706 A | 1/2011 | ............... | B06K 5/04 |
| JP | 2012017825 A | 1/2012 | ............... | F16H 3/72 |
| WO | 2010/095610 A1 | 8/2010 | ............... | B60K 6/36 |
| WO | 2018/192815 A1 | 10/2018 | ............... | B60K 6/36 |

\* cited by examiner

TRANSMISSION STRUCTURE FOR A SERIAL/PARALLEL HYBRID VEHICLE

CROSS-REFERENCE TO RELATED APPLICATIONS

This application claims priority to German Patent Application No. 10 2017 206 510.9, filed on Apr. 18, 2017 with the German Patent and Trademark Office. The contents of the aforesaid Patent Application are incorporated herein for all purposes.

TECHNICAL FIELD

The invention relates to a transmission structure for an in particular serial/parallel hybrid vehicle.

BACKGROUND

Serial/parallel hybrid vehicles have, in addition to an internal combustion engine, a first regenerative electric machine, in particular operable by a generator, and a second motorized electric machine, in particular operable by a motor. In a first driving range that extends from a vehicle standstill up to a certain vehicle speed, the system is operated serially in that power from the internal combustion engine is converted in the first regenerative electric machine into electrical energy and transferred to the second motorized electric machine, and then the vehicle propulsion system is operated thereby. As of the certain vehicle speed, the system is operated in-parallel in that a shift element is engaged by means of which the internal combustion engine is connected directly to the vehicle propulsion.

In EP 2 857 243 B1, a transmission structure for hybrid vehicles is known with an internal combustion engine, as well as with a first and second electric machine, wherein a first electric machine shaft assigned to the first electric machine can be driven by a drive shaft that can be driven by the internal combustion engine via a first gear set, and a travel drive gear of a differential gearing of the vehicle can be driven by a second electric machine shaft assigned to the second electric machine via a second gear set. The first gear set is formed in this case by two mutually engaging spur gears.

A transmission structure for a hybrid vehicle with an internal combustion engine and an electric machine is known from DE 10 2007 016 218 A1, wherein an electric machine shaft assigned to the electric machine can be driven by a drive shaft that can be driven by the internal combustion engine, and/or a transmission input shaft. In this case, the electric machine shaft has a ring gear with inner teeth in which a spur gear of the transmission input shaft engages to form a gear set.

The transmission structures known from the prior art for hybrid vehicles are however not optimally designed. Accordingly, the available installation space is frequently not optimally exploited. Frequently, the electric machine shafts are arranged above the internal combustion engine drive shaft, or respectively the crankshaft, and/or the travel drive shaft, and/or in a front region of the vehicle, and/or are at a large distance such as approximately 90-100 mm from the internal combustion engine drive shaft. Above the internal combustion engine drive shaft and/or the travel drive shaft, or respectively within the front vehicle region, or respectively engine compartment, there are generally other components such as lengthwise members and/or assembly carriers, and/or brake boosters, or respectively vehicle radiators as well that correspondingly restrict the installation space and radius that can be used for the electric machines, which can negatively affect the efficiency of the electric machines.

SUMMARY

An object is therefore to design and develop the aforementioned transmission structure such that it is as compact as possible, and in particular the use of the installation space and/or the efficiency of the electric machines is improved.

The object is solved by a transmission structure for an in particular serial/parallel hybrid vehicle with an internal combustion engine, a first, in particular regenerative, electric machine, and a second, in particular motorized, electric machine, having the features of the independent claim.

Specific details, aspects, features, and advantages of the present disclosure will in the following be described using various embodiments.

BRIEF DESCRIPTION OF THE DRAWINGS

In the FIGS..

DETAILED DESCRIPTION

In one aspect, a first electric machine shaft which is assigned to the first electric machine can be driven by the drive shaft which can be driven by the internal combustion engine via a first gear set. A travel drive gear of a differential gearing of the vehicle can be driven by a second electric machine shaft assigned to the second electric machine, in particular via a second gear set.

In this aspect, the first gear set comprises, e.g., a ring gear with inner teeth and a spur gear that engages in the inner teeth of the ring gear. The first gear stage is therefore formed in particular by the ring gear within inner teeth and the spur gear engaging in the inner teeth of the ring gear.

Accordingly, just a small axial offset of for example only about 20 mm between the internal combustion engine drive shaft and the electric machine shafts can be achieved that makes it possible to arrange the electric machines downward and/or to the front, e.g., such that the electric machine shafts lie at a greater distance from the travel drive shaft than the internal combustion engine drive shaft, e.g., the electric machine shafts lie in front of and/or underneath the internal combustion engine drive shaft when the transmission structure is installed transversely in a vehicle. Accordingly, the transmission structure can be designed more compactly, and the available installation space can be better exploited. For example, a collision of the installation space required for the electric machines with the other components such as lengthwise members and/or assembly carriers, and/or brake boosters, or respectively with the vehicle radiator and/or the ground clearance limit can thus be avoided. Accordingly, the installation space available for the electric machines can thus be increased, and their radius, or respectively diameter—in particular also while enabling clearance for the travel drive shaft (s)—can thereby be increased which can benefit the efficiency of the electric machines.

Moreover for example a shorter axial distance between the internal combustion engine drive shaft and the travel drive shaft, for example about 191 mm, can for example be realized, and a sufficient distance between the electric machine shafts and the travel drive shaft, for example about 210 mm, can be realized.

Moreover, a transmission ratio can, e.g., be effectuated by the first gear set in the form of the ring gear within inner teeth and the spur gear engaging in the inner teeth, e.g., that can be adjusted so that the first electric machine rotates at an optimum rotational speed for its efficiency, whereby the efficiency of the electric machine can also be further improved.

Furthermore, only an engagement of teeth, i.e., between the inner teeth of the ring gear and the spur gear, may be necessary. Friction loss and wear phenomena may thus be minimized, and efficiency can be further improved.

The spur gear may for example be arranged eccentric to the ring gear.

In some embodiments, the drive shaft of the internal combustion engine is arranged parallel, in particular upward, offset from the first and second electric machine shaft. In particular, the first and the second electric machine shaft are therefore arranged offset downward parallel to the drive shaft of the internal combustion engine. The radius of the first and/or second electric machine can accordingly be increased and its efficiency can thus be improved. In some the embodiments, the drive shaft is connected to rotate with the ring gear, and the spur gear is connected to rotate with the first electric machine shaft. The transmission structure can therefore be implemented in a particularly easy manner.

In some embodiments, the drive shaft can be coupled by a third gear set to the travel drive gear of the differential gearing, or respectively can be coupled to rotate, wherein the third gear set comprises outer teeth, and the drive shaft is connected to rotate with the outer teeth. The drive shaft can, e.g., be coupled by the third gear set, and with the assistance of a shift element, and/or an idler gear, to the travel drive gear of the differential gearing. Accordingly in parallel mode—in addition to the second electric machine—the internal combustion engine may also be used for vehicle propulsion, or the internal combustion engine may also realize vehicle propulsion by itself.

In some embodiments, the outer teeth are arranged on the ring gear. Accordingly, a particularly space-saving and rigid construction can be achieved. It is however also conceivable for the outer teeth to be designed and/or arranged as a separate gear, or respectively separate teeth on the drive shaft, or a component connected to rotate with the drive shaft in respective embodiments.

In some embodiments, the transmission structure has an intermediate shaft. In these embodiments, a gear connected to rotate with the second electric machine shaft may engage in a first intermediate shaft gear of the intermediate shaft. In these embodiments, a second intermediate shaft gear of the intermediate shaft may engage in the travel drive gear of the differential gearing. The first and second intermediate shaft gear may in this case be designed, e.g., in the form of fixed gears on the intermediate shaft. Accordingly, the flow of force can be transmitted for example via the gear of the second electric machine shaft and the first and second intermediate shaft gear to the travel drive gear of the differential gearing. In this case, a maximum of two tooth engagements may be necessary, i.e., on the one hand between the gear of the second electric machine shaft and the first intermediate shaft gear, and on the other hand between the second intermediate shaft gear and the travel drive gear. Friction loss and wear phenomena can thus be minimized. A second gear set is thus basically formed by the gear of the second electric machine shaft and by the first intermediate shaft gear, wherein the travel drive gear can be driven by the second gear set, by the intermediate shaft, and by the second intermediate shaft gear in engagement with the travel drive gear.

In some embodiments, the intermediate shaft has a third intermediate shaft gear, wherein the outer teeth of the drive shaft, or respectively the ring gear, engage in the third intermediate shaft gear of the intermediate shaft. For example, this forms the third gear set. For example, the third intermediate shaft gear may in this case be designed as an idler gear and be coupled to rotate with the intermediate shaft by a shift element. Accordingly, the flow of force may be transmitted via the third gear set, for example via the outer teeth of the ring gear, via the third intermediate shaft gear to the intermediate shaft, and from there via the second intermediate shaft gear to the travel drive gear. In this case, a maximum of two tooth engagements may be necessary, i.e., on the one hand between the outer teeth of the ring gear and the third intermediate shaft gear, and on the other hand between the second intermediate shaft gear and the travel drive gear. Friction loss and wear phenomena can thus be minimized. It is also conceivable in some embodiments for the third intermediate shaft gear to be designed as a fixed gear, and the outer teeth of the drive shaft, or respectively the ring gear, to be designed as an idler gear and be connectable to rotate with the drive shaft via the shift element.

In some embodiments, the transmission structure has a coupling shaft. In this case, outer teeth of the ring gear can, e.g., engage in a first coupling shaft gear of the coupling shaft. For example, this forms the third gear set. In this case, a second coupling shaft gear of the coupling shaft may, for example directly, engage in the travel drive gear of the differential gearing. One of the two coupling shaft gears may, e.g., be designed as a fixed gear on the coupling shaft. For example, the first coupling shaft gear can be designed as a fixed gear on the coupling shaft, and the second coupling shaft gear can be designed as an idler gear. By means of a shift element, the coupling shaft gear designed as an idler gear, e.g., the second coupling shaft gear, can be coupleable to the coupling shaft. Accordingly, the flow of force can be transmitted via the third gear set, for example via the outer teeth of the ring gear, via the first coupling shaft gear, via the coupling shaft to the second coupling shaft gear, and from there to the travel drive gear. In this case, a maximum of two tooth engagements are necessary, i.e., on the one hand between the outer teeth of the ring gear and the first coupling shaft gear, and on the other hand between the second coupling shaft gear and the travel drive gear. Friction loss and wear phenomena may thus be minimized. It is also conceivable in some embodiments for the second coupling shaft gear to be designed as a fixed gear, and the first coupling shaft gear to be designed as an idler gear and be connectable to rotate with the coupling shaft via the shift element.

The transmission structure in some embodiments has three gear planes. The first gear plane may be arranged closest to the internal combustion engine and may comprise the third gear set, i.e., the outer teeth of the ring gear and the first coupling shaft gear. The third gear plane may be arranged closest to the electric machines and may comprise the second gear set, i.e., the gear of the second electric machine shaft and the first intermediate shaft gear. The second gear plane lies between the first and third gear plane and, e.g., comprises the second coupling shaft gear, the second intermediate shaft gear, the travel drive gear and basically the first gear set that does not mesh with these gears, i.e., the ring gear and the spur gear of the first electric machine. In further embodiments without the coupling shaft, the first gear plane comprises the outer teeth of the ring gear and the third intermediate shaft gear, and the second gear plane only comprises the second intermediate shaft gear, the travel drive gear, and basically the first gear set that does not mesh with these gears. Accordingly, the shafts may be very short and therefore rigid. In other embodiments, the first gear set can lie in the first gear plane, and the outer and inner teeth of the ring gear therefore basically lie in a gear plane.

The shift element can for example be configured in the form of a sliding coupling. Alternatively, the shift element can also be configured as a clutch such as a multi-plate clutch.

In the some embodiments, the distance between the first and/or second electric machine shaft and the coupling shaft is less than the radius of the second and/or first electric machine, for example less than a distance from an axial center of the second and/or first electric machine to an outermost perimeter of a housing accommodating the second and/or first electric machine. The radius of the first and/or second electric machine and thus its efficiency can be improved.

The first electric machine shaft and the second electric machine shaft can, e.g., be arranged coaxial and/or concentric to each other. In some embodiments, the first electric machine shaft is designed in this case as an inner shaft (solid shaft), and the second electric machine shaft is designed as a hollow shaft.

In some embodiments, the transmission structure has a parking lock. For example, the second electric machine shaft or the intermediate shaft can be lockable by the parking lock. Since the second electric machine shaft and the intermediate shaft are both directly connected to rotate with the travel drive gear, the vehicle rolling while parking can be correspondingly prevented by locking one of these two shafts when the parking lock is engaged.

In some embodiments, the first electric machine shaft has a first and second electric machine shaft section. In this case, the first and second electric machine section can be connected to rotate and can be disengaged from each other by a clutch, for example a friction clutch. Accordingly, the first electric machine, for example at high vehicle speeds, can be disengaged from the internal combustion engine and, for example, the vehicle can be operated entirely by the internal combustion engine. Drag loss from drag from the first electric machine can be avoided in this case. This clutch can be designed as a noncontrollable overload clutch.

There are many options of designing and developing the transmission structure according to the present aspect in a beneficial manner. In this regard, reference is first made to the claims dependent on the independent claim. In the following, some embodiments of the transmission structure will be explained in greater detail with reference to the drawing and the associated description.

FIGS. 1 to 5, 6 and 7 and 8 schematically show sometimes slightly differing embodiments of a transmission structure for a serial/parallel hybrid vehicle with an internal combustion engine VKM, a first regenerative electric machine EM1, and a second motorized electric machine EM2. In this case, the first regenerative electric machine EM1 can have in particular a higher rotational speed, for example a rotational speed higher by approximately a factor of 1.9, than the internal combustion engine VKM.

A first electric machine shaft $W_{EM1}$ which is assigned to the first electric machine EM1 can be driven by a drive shaft $W_{VKM}$ which can be driven by the internal combustion engine VKM via a first gear set 1, for example with an overall transmission ratio of approximately i=2. By means of a second electric machine shaft $W_{EM2}$ assigned to the second electric machine EM2, a travel drive gear $Z_D$ of a differential gearing D of the vehicle can be driven via a second gear set 2 via an intermediate shaft $W_{ZW}$, for example with an overall transmission ratio of approximately i=8. The first and the second electric machine shaft $W_{EM1}$, $W_{EM2}$ are in this case arranged coaxially and concentrically to each other, wherein the first electric machine shaft $W_{EM1}$ is designed in the form of an inner shaft (solid shaft), and the second electric machine shaft $W_{EM2}$ is designed in the form of a hollow shaft surrounding the inner shaft.

During serial operation, power can be transferred from the internal combustion engine VKM via the first gear set 1 to the first regenerative electric machine EM1 and from the first regenerative electric machine EM1 into electrical energy. The second motorized electric machine EM2 can be driven by means of this electrical energy, and the vehicle can be driven by the second gear set 2, or respectively by the intermediate shaft $W_{ZW}$.

The drive shaft $W_{VKM}$ can be coupled to the travel drive gear $Z_D$ of the differential gearing D by a third gear set 3 and/or a coupling shaft $W_K$, or respectively with the assistance of a shift element S.

During parallel operation, the vehicle—in addition to the second motorized electric machine EM2—can therefore be driven via the third gear set 3 and the coupling shaft WK (when the shift element S is engaged) by the internal combustion engine VKM, for example with an overall transmission ratio of approximately i=3.5-2.4.

The figures show that the first gear set 1 has a ring gear $Z_H$ within inner teeth $Z_{HZ}$ and a spur gear $Z_{EM1}$ that engages in the inner teeth $Z_{HI}$ of the ring gear $Z_H$. In this case, the spur gear $Z_{EM1}$ is arranged eccentric to the ring gear $Z_H$. The drive shaft $W_{VKM}$ is connected to rotate with the ring gear $Z_H$, and the spur gear $Z_{EM1}$ is connected to rotate with the first electric machine shaft $W_{EM1}$. In doing so, the drive shaft $W_{VKM}$ is arranged offset parallel to the first and second electric machine shaft $W_{EM1}$, $W_{EM2}$.

The figures show moreover that the transmission structure has an intermediate shaft $W_Z$ with a first and second intermediate shaft gear $Z_{ZW1}$, $Z_{ZW2}$ in the form of a fixed gear. The second gear set 2 is formed in this case by a gear $Z_{EM2}$ connected to rotate with the second electric machine shaft EM2 in the form of a fixed gear and an intermediate shaft gear $Z_{ZW1}$ engaged with this fixed gear. A second intermediate shaft gear $Z_{ZW2}$ is provided that also engages in the travel drive gear $Z_D$ of the differential gearing D in the form of a fixed gear. The corresponding flow of force can then be transmitted via the second gear set 2, via the intermediate shaft $W_Z$ to the second intermediate shaft gear $Z_{ZW2}$ to the travel drive gear $Z_D$.

The figures furthermore show that the transmission structure has a coupling shaft $W_K$ with a first coupling shaft gear $Z_{K1}$ in the form of a fixed gear, and a second coupling shaft gear $Z_{K2}$ in the form of an idler gear. The third gear set 3 is formed in this case by outer teeth $Z_{HA}$ of the ring gear $Z_H$—that engage in the first coupling shaft gear $Z_{K1}$—and the first coupling shaft gear $Z_{K1}$. The second coupling shaft gear $Z_{K2}$ that engages, in particular directly, in the travel drive gear $Z_D$ of the differential gearing D is designed in particular as an idler gear and can be coupled by the shift element S, for example in the form of a sliding coupling or a clutch to the coupling shaft $W_K$. The corresponding flow of force can be transmitted via the third gear set 3, via the coupling shaft $W_K$, and via the second coupling shaft gear $Z_{K2}$ to the travel drive gear $Z_D$ (when the sliding coupling is engaged, or respectively shift element is engaged).

FIGS. 1, 2, 3, 5, 7 and 8 moreover show that the distance between the first, or respectively second electric machine shaft $W_{EM1}$, $W_{EM2}$ and the coupling shaft $W_K$ is less than the radius of the first, or respectively second electric machine EM1, EM2, in particular less than a distance from an axial center of the first, or respectively second electric machine EM1, EM2 to an outermost perimeter of a housing accommodating the first, or respectively second electric machine EM1, EM2.

The above statements essentially refer to the basic commonalities of the different embodiments. The differences will now be addressed in greater detail below:

In the embodiment shown in FIG. 1 to 5, the second electric machine shaft $W_{EM2}$ can be locked by a parking lock P.

Figure 1:
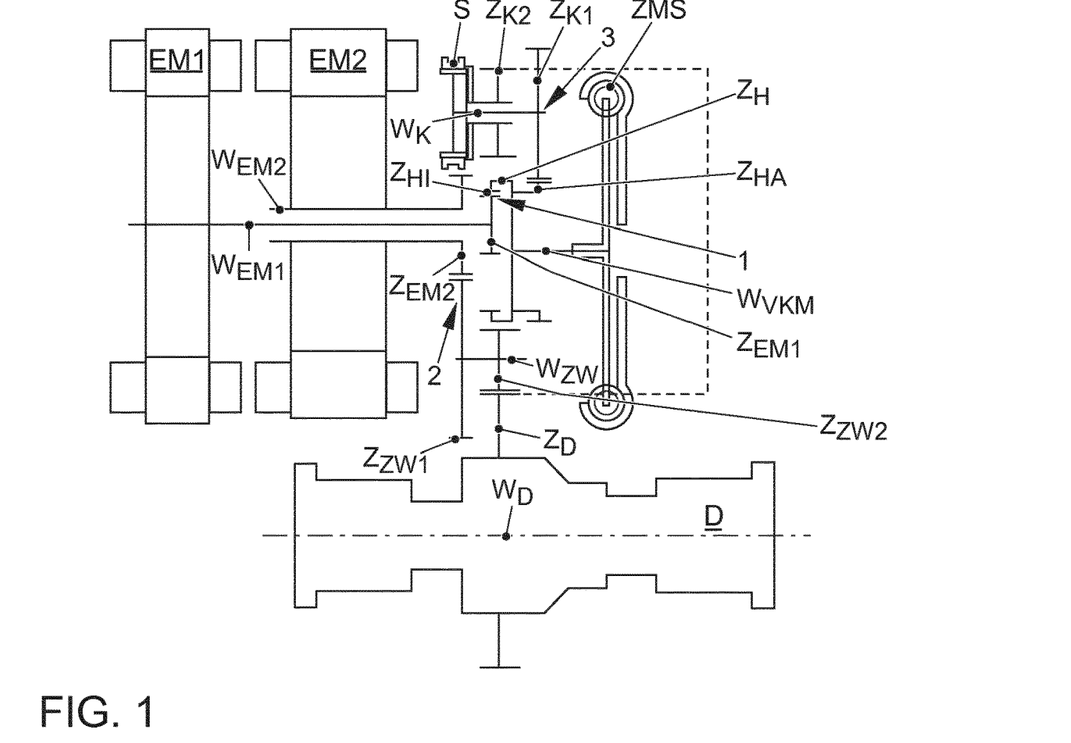
FIG. 1 shows a schematic representation of an embodiment of a transmission structure.
Figure 2:
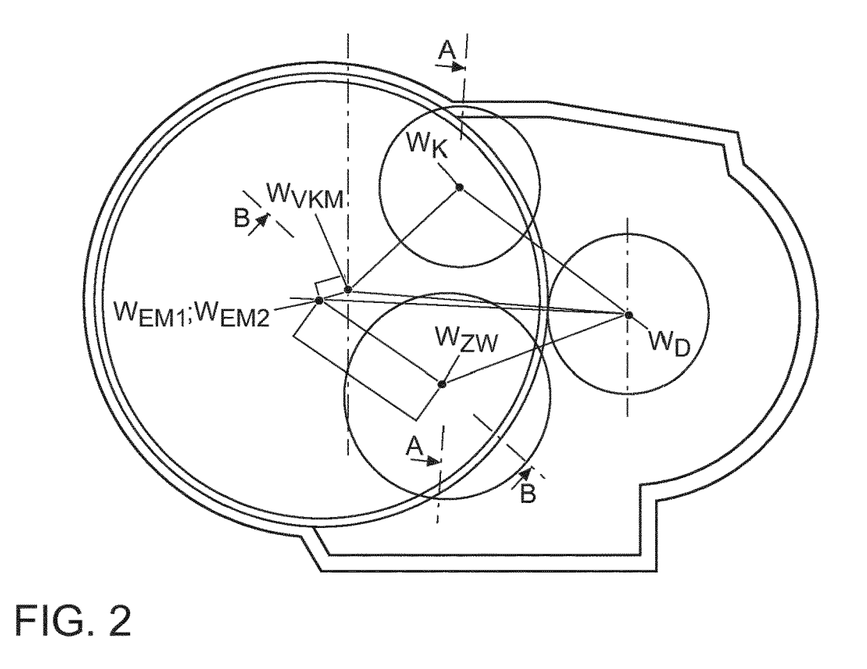
FIG. 2 shows a schematic representation to illustrate the arrangement and the diameter of the shafts of the embodiment of a transmission structure shown in FIG. 1.
Figure 3:
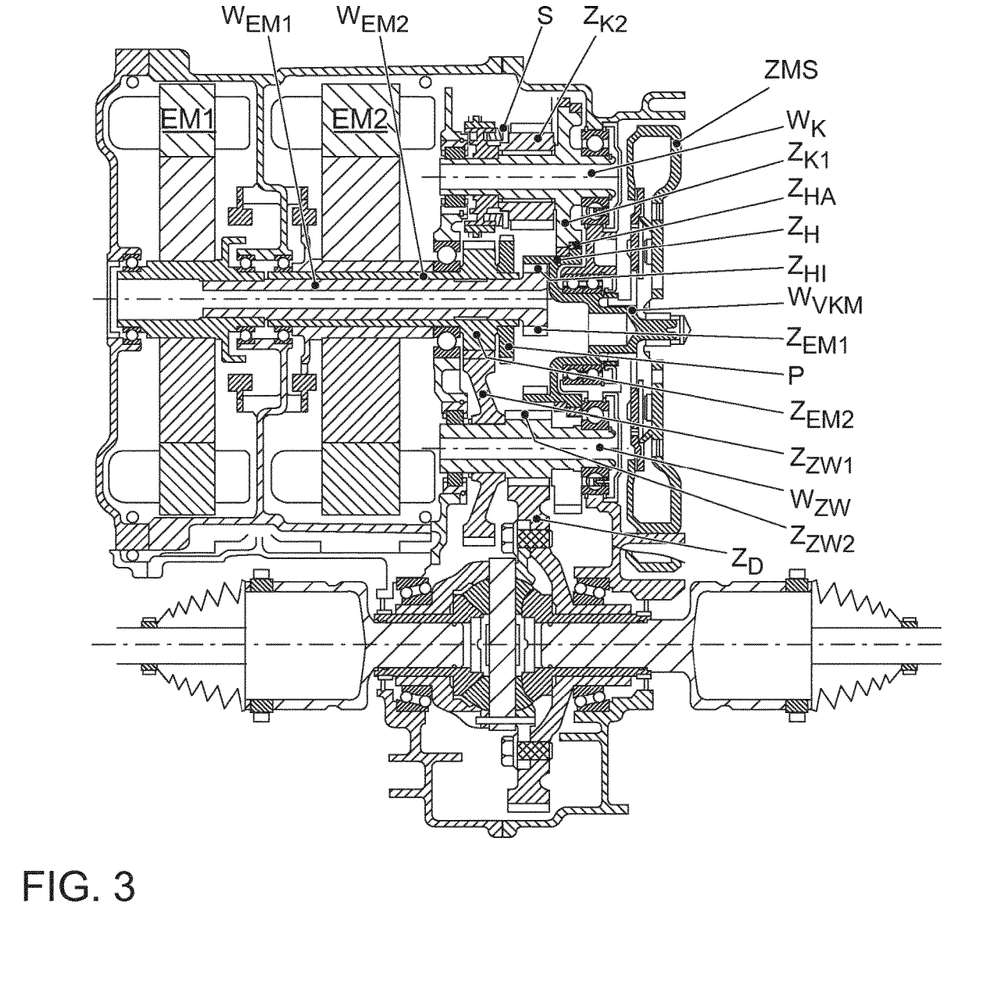
FIG. 3 shows a schematic cross-section of the embodiment of a transmission structure shown in FIGS. 1 and 2 with a parking lock locking a second electric machine shaft.
Figure 4:
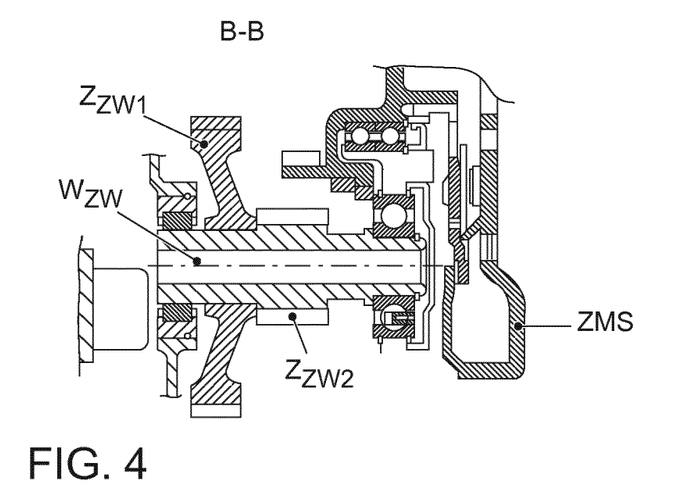
FIG. 4 shows a schematic cross-section/section of the embodiment of a transmission structure shown in FIG. 1 to 3 in the sectional plane B-B, in particular the immediate shaft.
Figure 5:
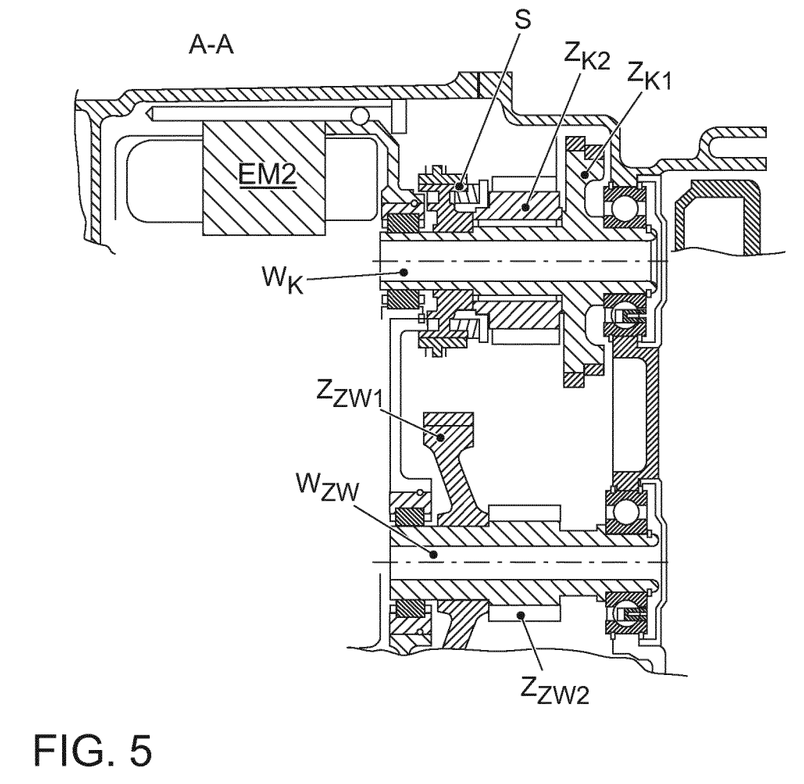
FIG. 5 shows a schematic cross-section/section of the embodiment of a transmission structure shown in FIG. 1 to 4 in the sectional plane A-A, in particular the immediate shaft and the coupling shaft.
Figure 6:
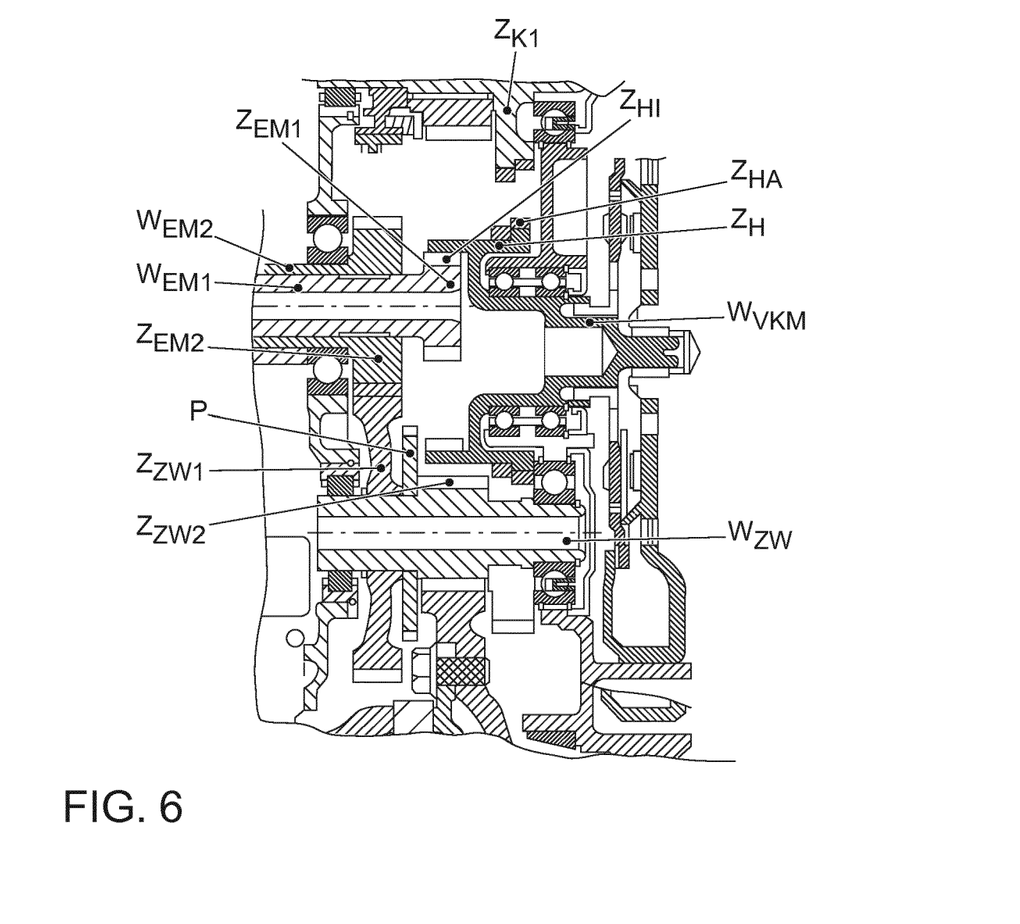
FIG. 6 shows a schematic cross-section of an additional embodiment of a transmission structure with a parking lock arranged in the region of the intermediate shaft.

In the embodiment shown in FIG. 6, the intermediate shaft $W_{ZW}$ can be locked by a parking lock P.

Figure 7:
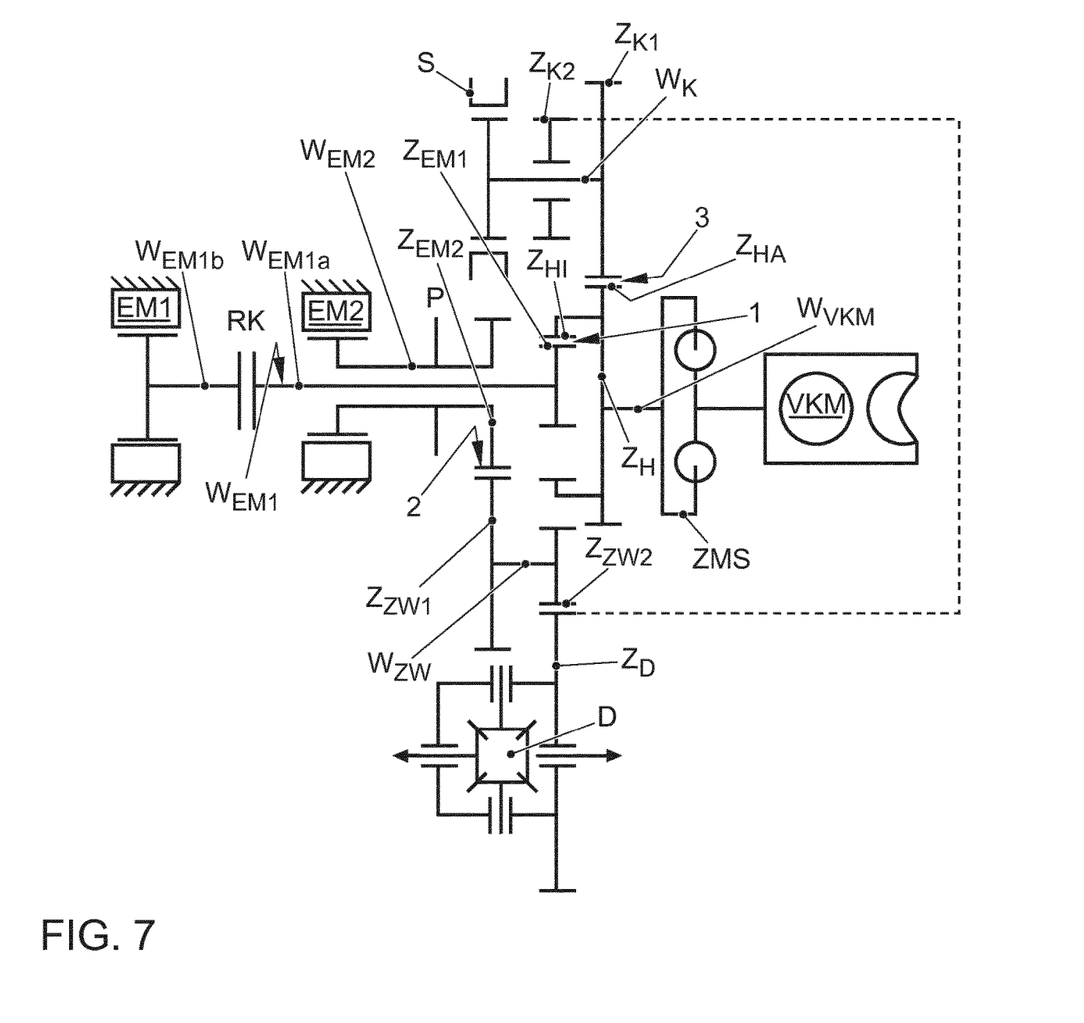
FIG. 7 shows a schematic representation of an additional embodiment of a transmission structure with a first electric machine shaft with a first and second electric machine shaft section that can be connected to rotate with and disengage from a friction clutch, and with a parking lock arranged in the region of the second electric machine shaft.
Figure 8:
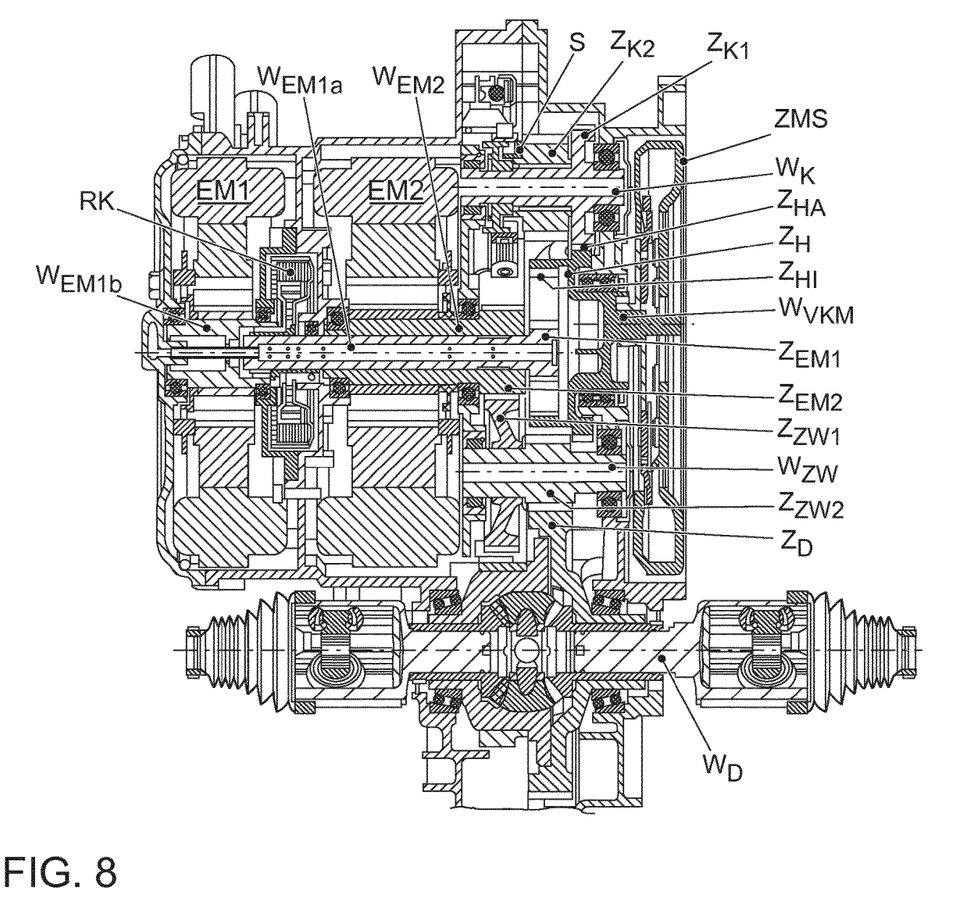
FIG. 8 shows a schematic cross-section of the embodiment of a transmission structure shown in FIG. 7 shown with construction details in this case.

In the embodiment shown in FIG. 7 to 8, the second electric machine shaft $W_{EM2}$ can be locked by a parking lock P analogous to the embodiment shown in FIG. 1 to 5. Moreover, the first electric machine shaft $W_{EM1}$ in this embodiment has a first and second electric machine shaft section $W_{EM1a}$, $W_{EM1b}$, wherein the first and second electric machine section $W_{EM1a}$, $W_{EM1b}$ can be rotatably connected to each other and can be disengaged from each other via a clutch RK, such as a friction clutch. Accordingly, the first electric machine EM1, for example at high vehicle speeds, can be disengaged from the internal combustion engine VKM, and for example the vehicle can be operated solely by the internal combustion engine and avoid drag loss from drag from the first electric machine EM1. It is also conceivable for the clutch (RK) to be designed as a slip clutch so that, in the case that the vehicle is braked, the inertial mass of the first electric machine EM1 can be disengaged from the drive shaft of the internal combustion engine.

Moreover, it is conceivable for a clutch to be effectively provided and/or arranged between the second electric machine and the second gear set alternatively or in addition to the clutch (RK).

With the embodiments shown in FIG. 1 to 8, the coupling shaft $W_K$ is arranged above the intermediate shaft $W_{ZW}$. It is however also possible to switch the arrangement of the coupling shaft $W_K$ and intermediate shaft $W_{ZW}$ from top to bottom.

Figure 9:
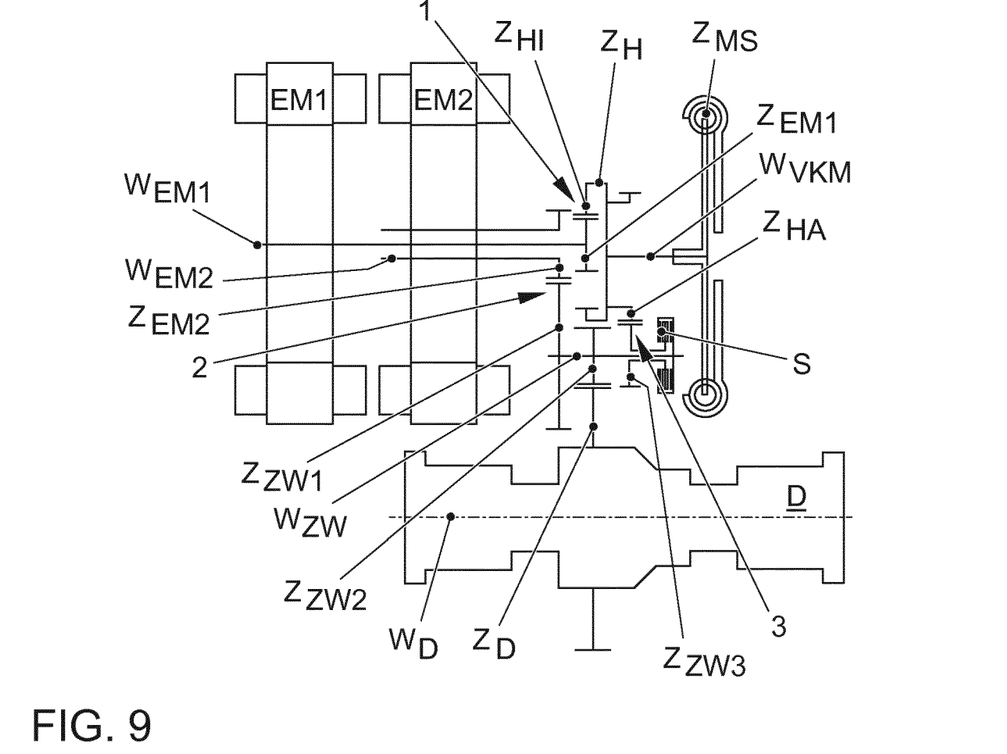
FIG. 9 shows a schematic representation of an another embodiment of a transmission structure.
Figure 10:
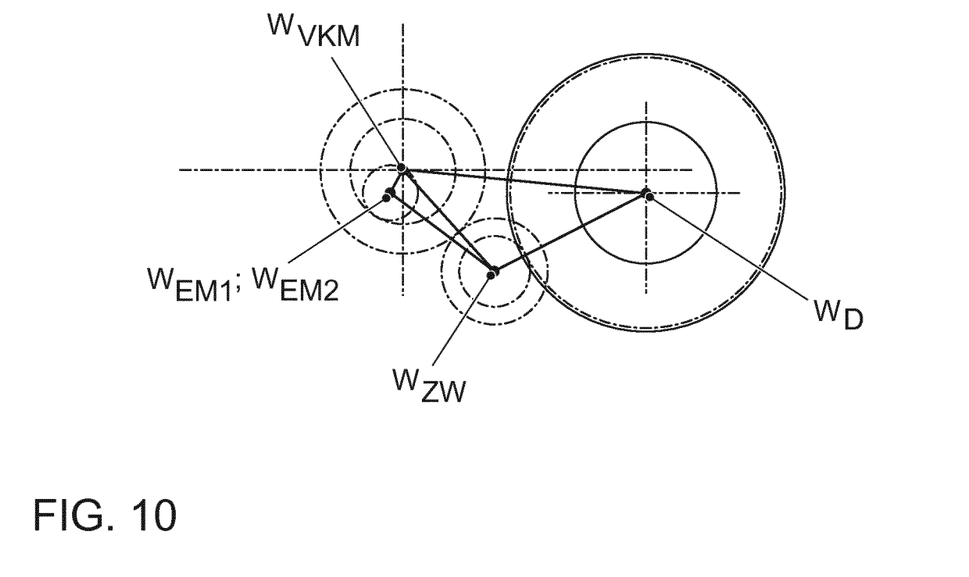
FIG. 10 shows a schematic representation to illustrate the arrangement and the diameter of the shafts of the embodiment of a transmission structure shown in FIG. 9.

FIGS. 9 and 10 schematically show another embodiment of the transmission structure. Only the differences from the structure shown in FIGS. 1 and 2 will be addressed. The figures show that the intermediate shaft $W_{ZW}$ has a third intermediate shaft gear $Z_{ZW3}$ in the form of an idler gear. The third gear set 3 is formed in this case by outer teeth $Z_{HA}$ of the ring gear $Z_H$ that engage with the third intermediate shaft gear $Z_{ZW3}$, and the second intermediate shaft gear $Z_{ZW2}$ that engages, in particular directly, in the travel drive gear $Z_D$ of the differential gearing D. The third intermediate shaft gear $Z_{ZW3}$, that in particular is designed as an idler gear, can be coupled by the shift element S, for example in the form of a sliding coupling or a clutch, to the intermediate shaft $W_{ZW}$. The corresponding flow of force can be transmitted via the third gear set 3, i.e., inter alia via the intermediate shaft $W_{ZW}$, and via the second intermediate shaft gear $Z_{ZW2}$ to the travel drive gear $Z_D$ (when the sliding coupling, or respectively shift element, is engaged).

FIGS. 9 and 10 show an example of the arrangement and the distance between the shafts, i.e., that the first, or respectively second electric machine shaft $W_{EM1}$, $W_{EM2}$ is arranged at a short distance below and in front of the drive shaft $W_{VKM}$, and the distance of the bottommost intermediate shaft $W_{ZW}$ to the first, or respectively second electric machine shaft $W_{EM1}$, $W_{EM2}$ is less than, or respectively substantially the same as to the drive shaft $W_{VKM}$. The first, or respectively second electric machine shaft $W_{EM1}$, $W_{EM2}$ and the intermediate shaft $W_{ZW}$ can also be arranged above the drive shaft $W_{VKM}$, or respectively the travel drive shaft $W_D$.

REFERENCE NUMBER LIST

VKM Internal combustion engine
$W_{VKM}$ Drive shaft
$Z_H$ Ring gear
$Z_{HI}$ Inner teeth
EM1 First, in particular regenerative, electric machine
$W_{EM1}$ First electric machine shaft
$W_{EM1a}$ First electric machine shaft section
$W_{EM1b}$ Second electric machine shaft section
$Z_{EM1}$ Spur gear of the first electric machine shaft
EM2 Second, in particular motorized, electric machine
$W_{EM2}$ Second electric machine shaft
$Z_{EM2}$ Gear of the second electric machine shaft
D Differential gearing
$W_D$ Travel drive shaft
$Z_D$ Travel drive gear
$W_{ZW}$ Intermediate shaft
$Z_{ZW1}$ First intermediate shaft gear
$Z_{ZW2}$ Second intermediate shaft gear
$Z_{ZW3}$ Third intermediate shaft gear
$W_K$ Coupling shaft
S Shift element
$Z_{K1}$ First coupling shaft gear
$Z_{K2}$ Second coupling shaft gear
1 First gear set
2 Second gear set 3 Third gear set
P Parking lock
RK Clutch
ZMS Dual-mass flywheel The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A transmission structure for an hybrid vehicle with:
an internal combustion engine;
a first electric machine; and
a second electric machine; wherein
a first electric machine shaft which is assigned to the first electric machine is drivable via a first gear set by an internal combustion engine drive shaft, which internal combustion engine drive shaft is drivable by the internal combustion engine;
a travel drive gear of a differential gearing of the vehicle is drivable via a second gear set by a second electric machine shaft which is assigned to the second electric machine;
the first gear set has a ring gear with inner teeth and a spur gear which engages with the inner teeth of the ring gear;
the drive shaft is connected to rotate with the ring gear, and the spur gear is connected to rotate with the first electric machine shaft;
the first electric machine shaft and the second electric machine shaft are arranged coaxial and concentric to each other;
the drive shaft is arranged offset parallel to the first and second electric machine shaft;
the drive shaft is connectable by a third gear set to the travel drive gear of the differential gearing, and the third gear set comprises outer teeth, wherein the drive shaft is connected to rotate with the outer teeth; the outer teeth are arranged on the ring gear; and wherein an axial offset between the drive shaft and the electric machine shafts is provided, so that the electric machine shafts are arranged at a greater distance from a travel drive shaft than the internal combustion engine drive shaft.

2. The transmission structure according to claim 1, wherein the transmission structure has an intermediate shaft, wherein a gear connected to rotate with the second electric machine shaft engages in a first intermediate shaft gear of the intermediate shaft, and wherein a second intermediate shaft gear of the intermediate shaft engages in the travel drive gear of the differential gearing.

3. The transmission structure according to claim 1, wherein the outer teeth engage in a third intermediate shaft gear of the intermediate shaft, wherein the third intermediate shaft gear is configured as an idler gear, and wherein the third intermediate shaft gear is connectable to rotate with the intermediate shaft by means of a shift element.

4. The transmission structure according to claim 1, wherein the transmission structure has a coupling shaft, wherein the outer teeth engage in a first coupling shaft gear of the coupling shaft, wherein a second coupling shaft gear of the coupling shaft engages in the travel drive gear of the differential gearing, and wherein the second coupling shaft gear is connectable to rotate with the first coupling shaft gear by means of a shift element.

5. The transmission structure according to claim 4, wherein the distance between one or more of the first and the second electric machine shaft and the coupling shaft is less than the radius one or more of the first and the second electric machine.

6. The transmission structure according to claim 1, wherein the transmission structure has a parking lock, wherein the second electric machine shaft or the intermediate shaft is lockable by the parking lock.

7. The transmission structure according to claim 1, wherein the first electric machine shaft has a first and second electric machine shaft section, wherein the first and second electric machine section is rotatably connectable to each other and can be disengaged from each other via a clutch.

8. The transmission structure according to claim 1, wherein the second electric machine shaft or the intermediate shaft has a parking lock gear.

9. The transmission structure according to claim 7, wherein the clutch is a friction clutch.

* * * * *